United States Patent [19]
Giger

[11] 3,757,244
[45] Sept. 4, 1973

[54] PHASE LOCKED LOOP WITH NON-LINEAR FILTER RESPONSIVE TO ERROR SIGNAL AMPLITUDE

[75] Inventor: Adolf Josef Giger, Boxford, Mass.

[73] Assignee: Bell Telephone Laboratories, Incorporated, Murray Hill, Berkeley Heights, N.J.

[22] Filed: Mar. 6, 1972

[21] Appl. No.: 232,097

[52] U.S. Cl. ............. 331/17, 178/70 T, 179/170 R, 329/122, 331/25, 333/70 CR
[51] Int. Cl. ............................................. H03b 3/04
[58] Field of Search .......................... 331/17, 18, 25; 325/419; 329/122; 333/70 CR; 178/70 T; 179/170 R

[56] References Cited

UNITED STATES PATENTS

| | | | |
|---|---|---|---|
| 2,932,793 | 4/1960 | Smith et al. | 331/17 X |
| 2,912,651 | 11/1959 | Leeds | 331/17 |
| 3,316,497 | 4/1967 | Brooks | 331/17 |

*Primary Examiner*—Roy Lake
*Assistant Examiner*—Siegfried H. Grimm
*Attorney*—W. L. Keefauver et al.

[57] ABSTRACT

For use in pulse timing recovery and other applications, a phase locked loop is proposed having a nonlinear network in which both gain and bandwidth are functions of the eror signal amplitude. The network comprises an RC phase-lag filter in which diodes vary the shunt resistance component.

6 Claims, 4 Drawing Figures

PHASE LOCKED LOOP WITH NON-LINEAR FILTER RESPONSIVE TO ERROR SIGNAL AMPLITUDE

BACKGROUND OF THE INVENTION

This invention relates to pulse synchronizing systems and, more particularly, to the use of a phase locked loop having a particular nonlinear characteristic.

Long distance transmission of digital information in the form of a bit stream comprising positive and negative pulses is known to be very desirable if such a pulse sequence has a continuous power spectrum. A continuous power spectrum is achieved if the pulse sequence has, by proper scrambling, been made random and equiprobable. This process minimizes so-called d-c wander, and interference into other systems becomes well controlled. However, the continuous power spectrum is unsuitable for recovering timing information by conventional processes.

It has been recognized that full wave rectification of the bit stream will produce a spectral line at the bit stream symbol rate and that a phase locked loop may be locked to this frequency. Since this frequency is used for retiming purposes of the digital bit stream, high requirements are imposed on the phase locked loop in terms of phase error, introduced noise, damping, jitter, cycle skipping and pull-in.

In a simple loop some of these objectives appear to be incompatible. To meet some of these characteristics with a greater degree of freedom, the present invention proposes the inclusion of a nonlinear circuit in the loop which introduces a two mode characteristic associated respectively with the large error signal acquistion operation and a small error signal locked operation. The beneficial effects of such a circuit specifically include (1) wide band and rapid pull-in operation and (2) very small phase errors, low phase jitter and strongly over damped operation in the locked state. The over damped loop response is absolutely necessary in a long chain of digital repeaters to avoid large gain enhancements that would result in an unacceptable transient response of the timing phase from end-to-end.

SUMMARY OF THE INVENTION

In accordance with the invention it has been recognized that a phase locked loop having both nonlinearity as to gain and nonlinearity as to bandshaping has the precision required for timing recovery. The loop includes a network having such a direct current nonlinearity that the gain changes from a small value for absolute phase errors greater than a given value to a larger gain for phase errors below said given value. At the same time the bandwidth of the network is substantially decreased. In other words, the direct current loop gain is increased without substantially increasing the response of the loop to substantially higher frequency components which include the noise and jitter frequencies. In particular, the network comprises a resistor-capacitor in a phase-lag filter configuration which is at least partially shunted by further resistance when the amplitude of the error signal exceeds a given value. In the particular embodiment to be described, back biased diodes are employed to connect separate shunt resistors for respective positive and negative error signals.

DETAILED DESCRIPTION

Figure 1:
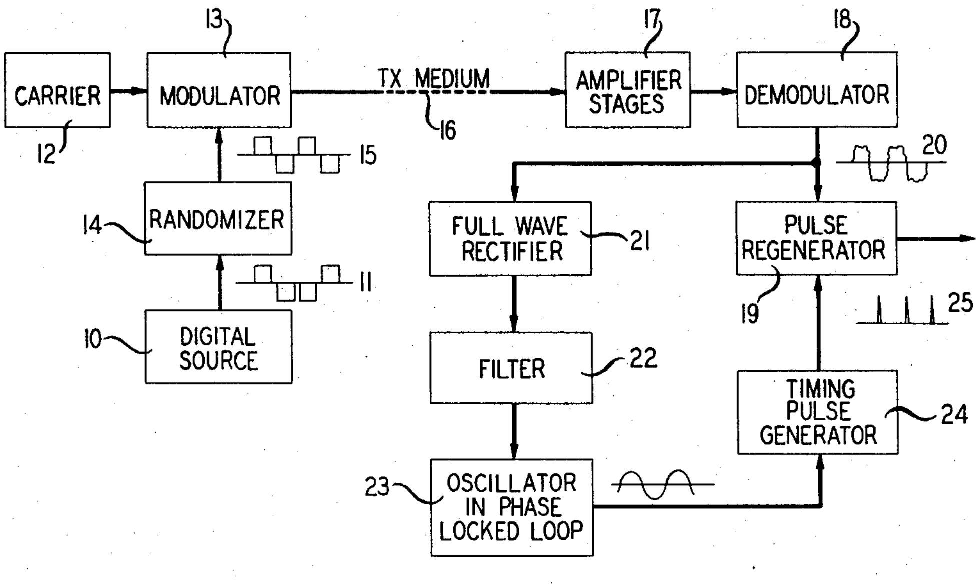
FIG. 1 is a block diagram of a transmission system for pulses having a continuous power spectrum which employs a phase locked loop to recover pulse timing.

Referring more particularly to FIG. 1, a pulse transmission system of the type in which the phase locked loop of the present invention has application is shown. A source 10 of digital information in the form of bit stream 11 having positive and negative pulses, respecitvely representing "ones" and "zeroes," for example, is impressed upon a carrier from source 12 by modulator 13. Since bit stream 11 is likely to have a number of pulses of the same sign in a sequence, randomizer 14 is included between source 10 and modulator 13 to scramble bit stream 11 according to a predetermined quasi random pattern so that the resulting bit stream 15 has the probability of an equal number of positive and negative pulses. This results in a pulse spectrum that is continuous and a signal stream that has zero d-c content. For reasons which are not of direct concern here, such a continuous power spectrum is desirable because of the greater ease and efficiency with which it may be transmitted over medium 16.

At a repeater station along medium 16, the signal is boosted in amplifier stages 17, applied to demodulator 18 for the purpose of retrieving the baseband pulses for reshaping and retiming in pulse regenerator 19. Bit stream 20 represents the pulses which have been substantially distorted in amplitude and/or phase as a result of transmission through medium 16. The system thus far described is well known in the art and further consideration of any of its components is not required.

It is further known that the operation of pulse regenerator 19 depends upon an accurate reconstruction of the timing information related to the bit stream 20. If the bit stream is applied to a full wave rectifier 21, the output thereof will have a strong spectral line at the symbol rate. This spectral line is selected by the relatively broad passband filter 22 and employed as the reference signal to which the oscillator in a phase locked loop 23 is tied. The phase locked oscillator reconstructs a sine wave at the symbol rate frequency from the spectral line and this wave drives timing pulse generator 24 to produce accurate timing pulses 25 for regenerator 19. As noted hereinbefore, high precision must be had for phase locked loop 23 to meet the requirements for such an application. Thus, the particular loop now to be described in accordance with one aspect of the invention is particularly suited for this application.

Figure 2:
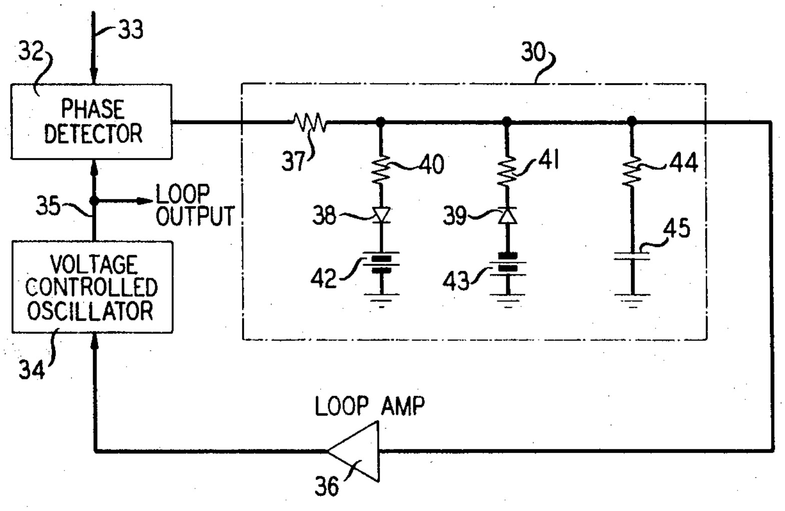
FIG. 2 illustrates further details of the phase locked loop of FIG. 1.

Referring to FIG. 2, the oscillator and phase locked loop 23 of FIG. 1 is shown in more detail. It will be apparent to one skilled in the art that except for the nonlinear network contained within the dotted rectangle 30, the phase locked loop is similar to those of the prior art. More specifically, it comprises a phase detector 32 to which the input reference signal is applied by way of lead 33, a nonlinear network 30 to which the output of the phase detector is applied, a loop amplifier 36 which adds gain to the signal from network 30, and a voltage controlled oscillator 34 whose frequency is controlled by the amplified signal from amplifier 36. The output of oscillator 34 on lead 35 is applied to phase detector 32 and also comprises the output of the phase locked loop. Thus, the phase error and/or frequency error between oscillator 34 and the reference signal on lead 33 is detected by phase detector 32 and is applied to nonlinear network 30 and amplifier 36, which convert it to a steering voltage for controlling the phase and frequency of oscillator 34 in a servo mode of operation. Oscillator 34 may take any number of known forms which include means for controlling the frequency in response to the magnitude of applied direct current voltage, such as a variable capacitance diode or varactor.

Nonlinear network 30 comprises a phase-lag filter network (a form of low pass filter) in which the shunt resistance value is a nonlinear function of the error signal amplitude. More particularly, the network comprises the series combination of resistor 37, resistor 44 and capacitor 45 with the loop input from detector 32 (a voltage source) applied across the three components and the output voltage taken across resistor 44 and capacitor 45. Such a network is known to have "corner" frequencies defined by $$f_1 = 1/2\pi R_{44} C_{45} \qquad (1)$$

and $$f_2 = [1/2\pi C_{45}\,(R_{44} + R_{37})]. \qquad (2)$$

A resistor 40 is provided which is connected in shunt with resistor 44 and capacitor 45 when the signal exceeds a given level in the positive direction. For example, such connection means may comprise a diode 38 which is back biased by a positive potential equal to said given potential as represented by battery 42. Alternatively, a resistor 41 equal in value to resistor 40 is connected in shunt with resistor 44 and capacitor 45 for negative voltages by diode 39 which is back biased by source 43. The connection of either shunt resistor 40 or 41 increases the direct current attenuation of the network and shifts the low frequency or second corner frequency of equation (2) to a new value $f'_2$ in the direction of the first corner frequency of equation (1).

The new low frequency corner may be specified as $$f_2' = \frac{1}{2\pi C_{45}\left(R_{44} + \frac{R_{40}R_{37}}{R_{40}+R_{37}}\right)} \qquad (3)$$

where $$R_{40} = R_{41}\,.$$

Change in network attenuation may be defined as a function of $k$, less then unity, equal to $$k = R_{40}/R_{40} + R_{37}. \qquad (4)$$

When such a network is introduced into a phase locked loop and when resistors 41 and 40 are removed from the loop by the opening of diodes 38 and 39 for small signals, the gain of the loop is increased at direct current without proportionally increasing it at substantially higher frequencies.

Phase detector 32 compares the phase of the reference signal on lead 33 against the phase of the output of voltage controlled oscillator 34. The output voltage of detector 32 is a measure of the phase difference between these signals. If the compared signals have different frequencies, the output of detector 32 is periodic at a frequency equal to their difference. If the compared frequencies are identical, then the detector output will be zero frequency, that is, a direct current error signal which will be a measure of the phase difference between the two signals. Particularly, detector 32 is assumed to be designed so that the magnitude of its output votlage is a substantially liner function of this phase difference between $-\pi/2$ and $\pi/2$ phase difference to simplify the description of the invention. The dotted characteristic 51, shown in FIG. 3, describes the form of the output voltage from phase detector 32 for essentially any value of the phase error. Note the periodic nature of this "sawtooth signal." A more easily produced sinusoidal output characteristic is equally suitable and functions in substantially the same way.

Figure 3:
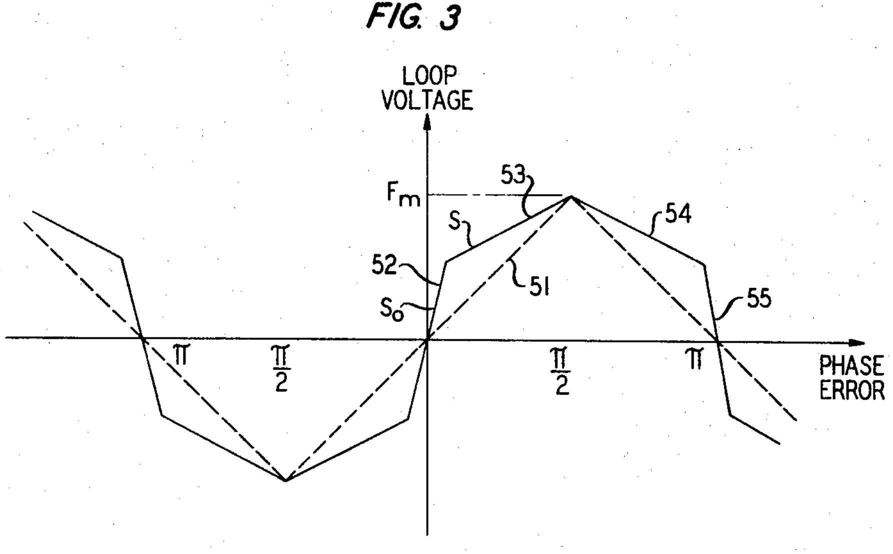
FIG. 3 is a plot of the direct current non-linearity of the loop of FIG. 2.
Figure 4:
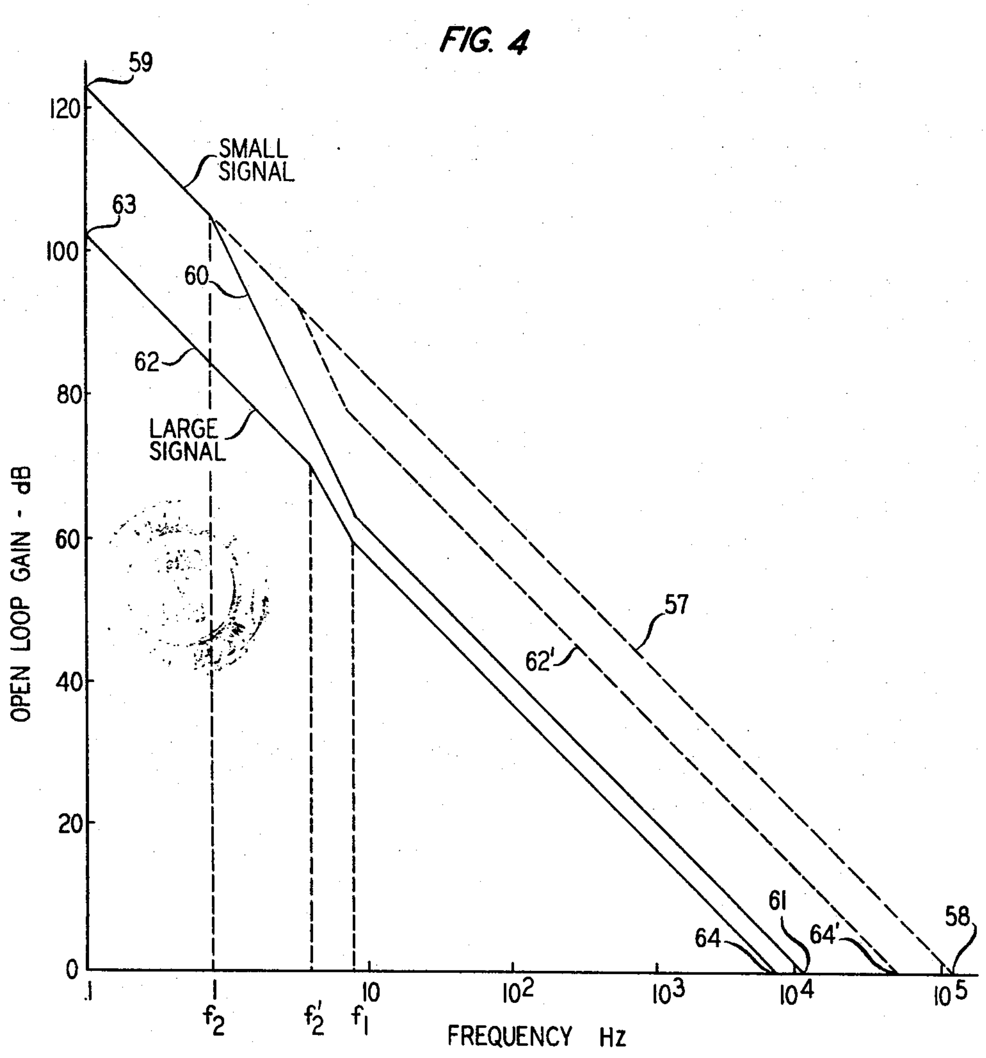
FIG. 4 is a plot of the open loop gain of the loop of FIG. 2.

While a detailed mathematical analysis of the performance of the loop is believed to be beyond the scope of the present disclosure, it may be qualitatively analyzed with the aid of FIGS. 3 and 4. In FIG. 3 the direct current loop frequency (a function of phase error) available at the output of oscillator 34 is, as a result of the nonlinear action of network 30, plotted as a function of phase error over a range substantially larger than from $-\pi/2$ to $+\pi/2$. The present invention is concerned with bringing the phase error into the range between $-\pi/2$ and $\pi/2$ as quickly as possible, and particularly, in reducing the phase error in the range immediately surrounding zero. For the latter purpose it will be apparent that the steepest possible slope for characteristic 51 would be preferred. However, the maximum value $F_m$ to which the oscillator frequency can be deviated is limited by saturation of the circuits in the loop. Thus, the present invention introduces the nonlinearity represented by characteristics 52 and 53. For small amplitude error signals, neither diode 38 nor 39 conducts and the loop voltage versus phase error characteristics rises steeply from the origin as shown by characteristic 52, the slope $S_o$ being a function of the direct current gain introduced by amplifier 36. When either diode 38 or 39 conducts (depending on whether the phase error is positive or negative) at some level determined by the back bias voltage corresponding to a frequency offset well below the saturation value $F_m$, the appropriate resistor 40 or 41 is shunted across the loop, reducing the loop voltage to that represented by the slope of S of characteristic 53. The ratio of $(S/S_o) = k$, with $k$ being defined by equation (4) hereinbefore. For errors above $\pi/2$, negative slope S portion 54 is followed by negative slope $S_o$ portion 55. Because of its resemblance to a Mansard roof, the characteristic can be characterized as a "Mansard" nonlinearity. Thus, the steep portion 52 near the origin assures small phase errors in the locked condition.

FIG. 4 shows the open loop gain versus frequency characteristic of the loop for operation in the vicinity of the origin of FIG. 3 under several different conditions and is useful in understanding the several criteria which effect the loop performance. The straight line characteristic 57 represents the open loop gain of the loop in the absence of the modification thereof by network 30. The gain at which characteristic 57 crosses the ordinate, such as point 59, being the loop gain at very low frequencies, determines the phase error under the locked condition and is, therefore, desirably as large as possible. The frequency at which characteristic 57 crosses the abscissa such as point 58 determines the pull-in range and noise bandwidth. Large values of pull-in range and noise bandwidth are the natural consequence of the high gain requirement depicted by point 59. The large noise bandwidth is very undesirable because it increases the amount of noise introduced to the output signal, as well as jitter and cycle skipping. However, if the slope of the straight line portion of characteristic 57–58–59 is more than 6 db per octave, the loop is known to be unstable and to produce overshoot.

As compared to characteristic 57–58–59, the network in accordance with the invention is represented by characteristics 59–60–61 and 62–63–64 which result from the particularly proportioned phase-lag filter comprising resistor 37, resistor 44 and capacitor 45 with and without the shunting effect of resistors 40 and 41, respectively. The corners $f_1$ and $f'_2$ of the large signal characteristic 62–63–64, calculated in accordance with equations (1) and (3) above, are located relatively close together in frequency and otherwise are chosen so that the characteristic crosses the ordinate at point 64 at a value producing a desired pull-in range and a certain associated noise bandwidth. Now, if the gain of the loop were simply increased for small signals, and the corner frequencies did not change, characteristic 62–63–64 would move up to the position shown by broken characteristic 59–62'–64', increasing the noise bandwidth to point 64'. Instead, the network in accordance with the invention produces the small signal characteristic 59–60–61 when either diodes 38 or 39 opens to remove shunt resistors 40 and 41. The high frequency corner $f_1$ remains the same but the low frequency corner $f_2$ is now determined by equation (2), introducing to characteristic 59–60–61 an extended region of rapidly changing gain with frequency between $f_2$ and $f_1$. The low frequency current gain substantially increases to point 59 from point 63 to minimize the locked phase error and yet the breaks in the characteristic 59–60–61 are such that the noise bandwidth increases only slightly from point 64 to point 61. Since the portion of characteristic 59–60–61 having a greater than 6 db slope is tens of decibels above the abscissa, loop stability is not jeopardized and a strongly over damped response of the loop is ensured.

In summary, characteristic 59–60–61 is desirable for the small signal operation that exists along slope 52 of FIG. 3. It accomplishes (1) a small phase error by virtue of the high gain at point 59; (2) a very low phase jitter because of the small closed loop bandwidth indicated by point 61; and (3) a strongly over damped response due to the high open loop gain at frequency $f_1$. Characteristic 62–63–64 is desirable for large signal operation that exists along slope 53 of FIG. 3 since saturation is avoided and yet a respectable pull-in range and a corresponding fast pull-in time is achieved.

While the phase locked loop described has particular usefulness in the timing recovery application described, it should be understood that it has similar usefulness in other systems requiring synchronism or automatic frequency control operations.

What is claimed is:

1. In a phase locked loop system wherein the frequency of the signal produced by a controlled oscillator is compared in a phase detector with a reference signal to produce a control voltage for said oscillator, said control voltage having a direct voltage component depending on the displacement between the signal produced by said oscillator and the reference signal, a transmission path for said control voltage from said detector to said oscillator including network means for increasing the gain of said path for said direct voltage component without proportionally increasing the response of said path to substantially higher frequency alternating components when the absolute amplitude of said control voltage component is less than a given value.

2. The system of claim 1 wherein said network means comprises a reactive phase-lag filter network and means for shunting said filter network with a shunting resistance when said absolute amplitude exceeds said given value.

3. The system of claim 2 wherein said phase-lag filter includes the series combination of a first resistance and a capacitance and wherein said means for shunting connects said shunting resistance across said capacitance and at least part of said first resistance.

4. The system according to claim 3 wherein the components of said filter and said shunting resistance are proportioned to increase the frequency difference between the corner frequencies of the filter characteristic when said absolute amplitude is less than said given value and to decrease said difference when said absolute amplitude is greater than said given value.

5. The system of claim 2 wherein said means for shunting includes a first back biased diode poled to connect said shunting resistance in shunt with said filter network when the amplitude of said control voltage exceeds said bias in one sense and a second back biased diode poled to connect said shunting resistance in shunt with said filter network when the amplitude of said control voltage exceeds said bias in the other sense.

6. In a transmission system for bipolar pulses having a substantially continuous power spectrum, means for recovering timing information from baseband pulses which comprises a full wave rectifier to which said pulses are applied, means for filtering said pulses as rectified with a bandpass characteristic centered upon the expected timing frequency of said pulses, an oscillator included in a phase locked loop, means for applying said filter output as the reference signal to said loop, said loop having a nonlinear characteristic that increases the direct current gain of said loop when the displacement between said oscillator and said reference signal is small without proportionally increasing the response of said loop to substantially higher frequency alternating currents.

* * * * *